Sept. 6, 1938. M. E. LANGE ET AL 2,128,950
MACHINE TOOL
Filed March 21, 1936 6 Sheets-Sheet 4
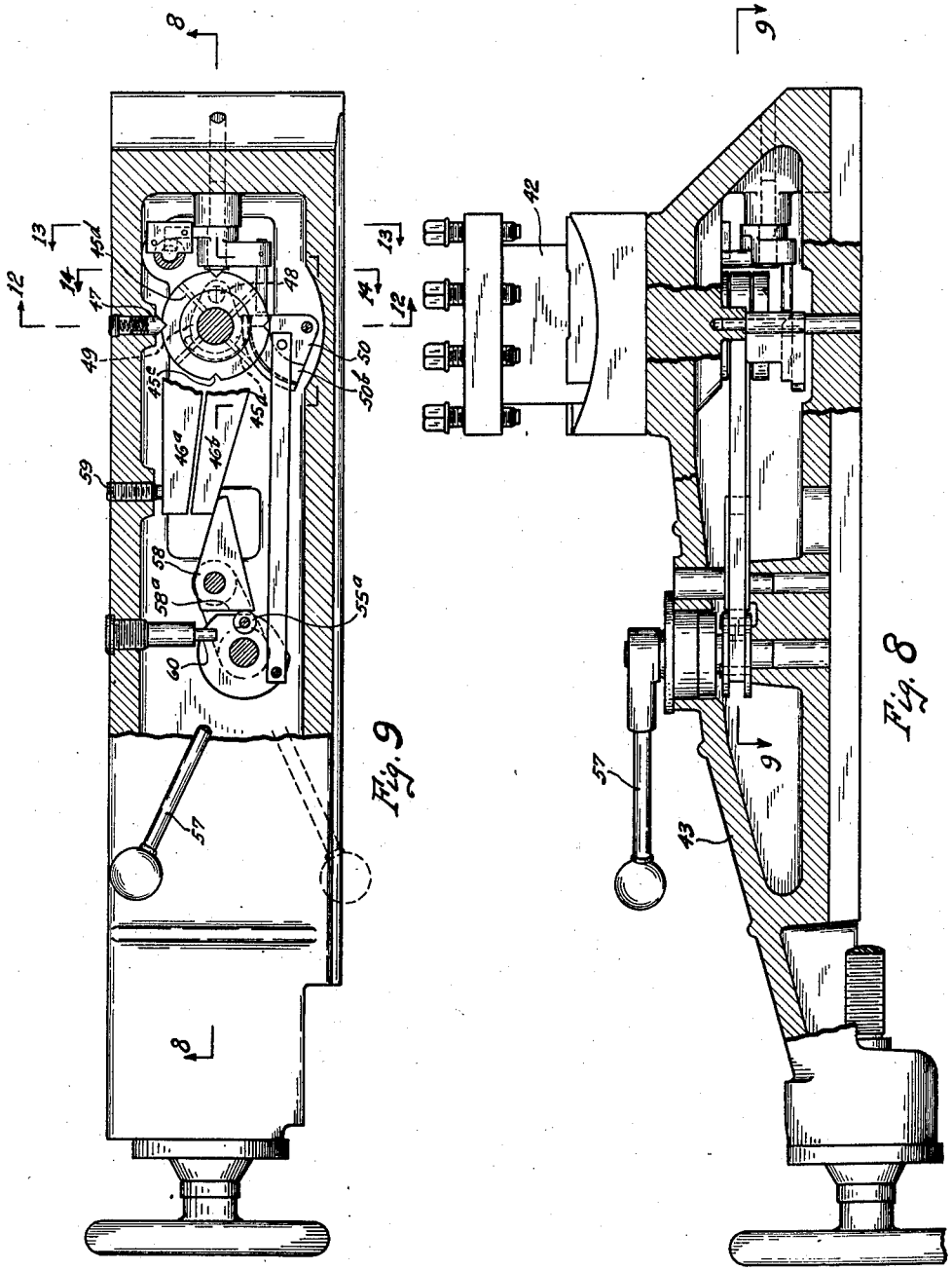
INVENTORS.
MAX E. LANGE
BY NICHOLAS P. DARASH
ATTORNEYS.

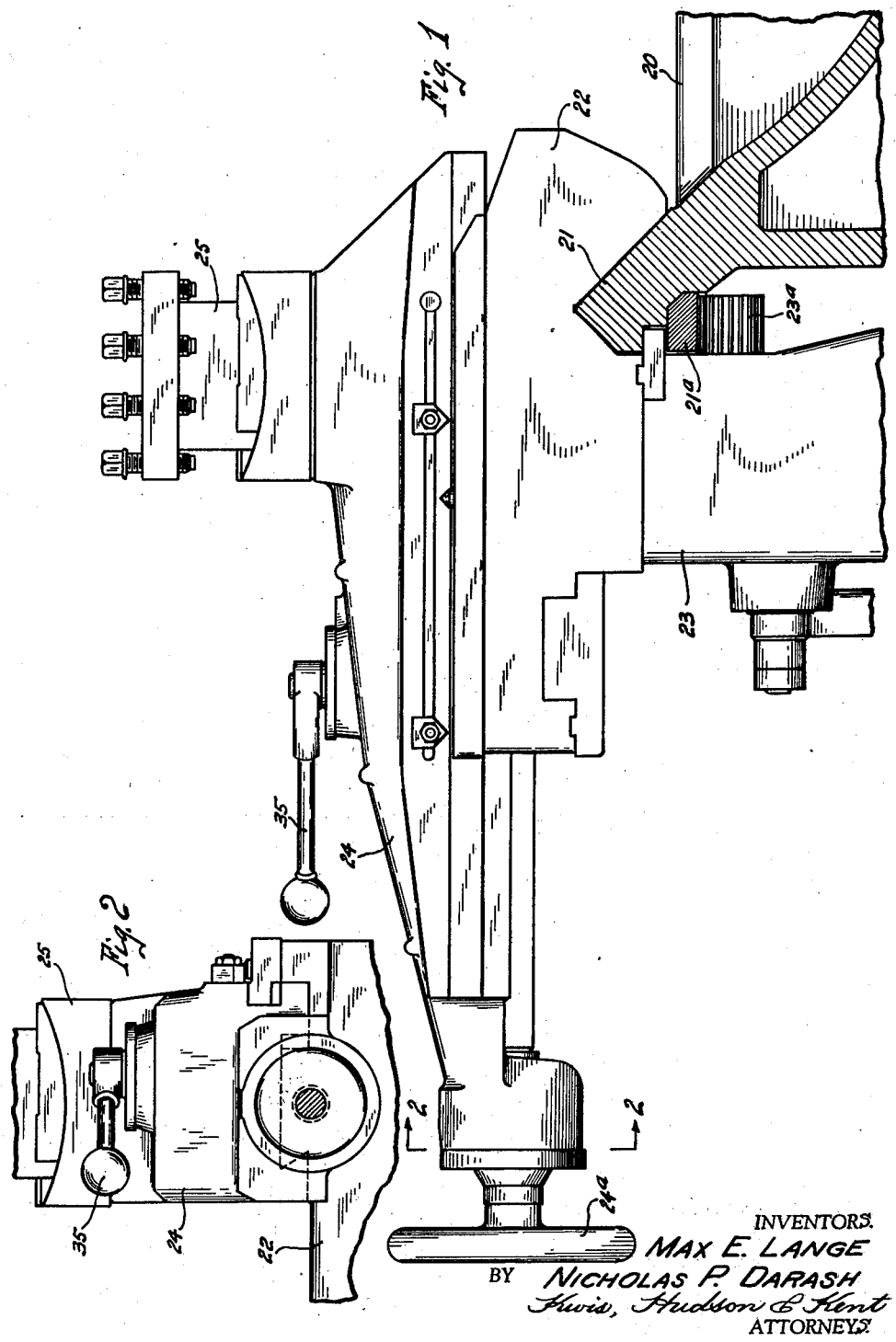

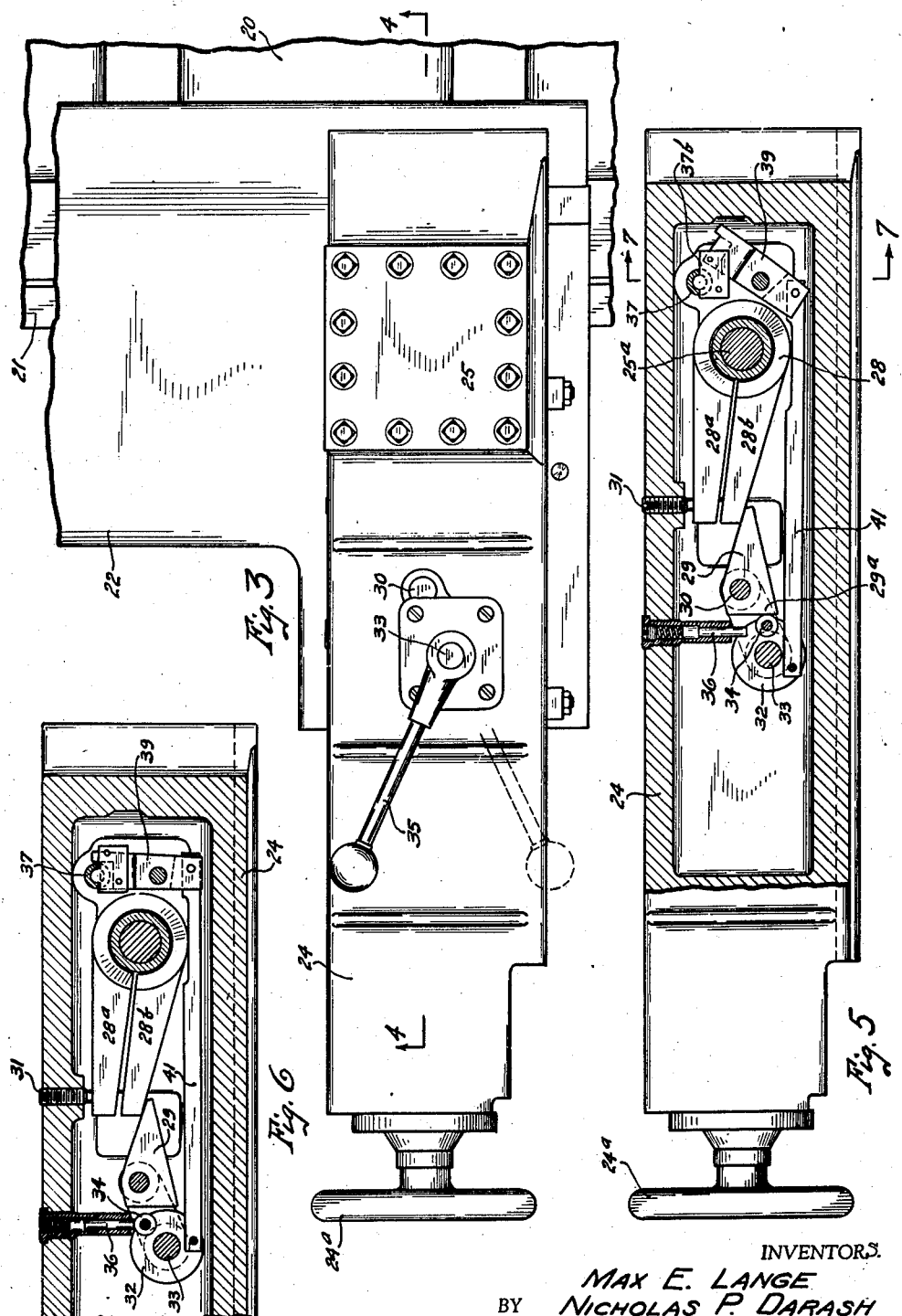

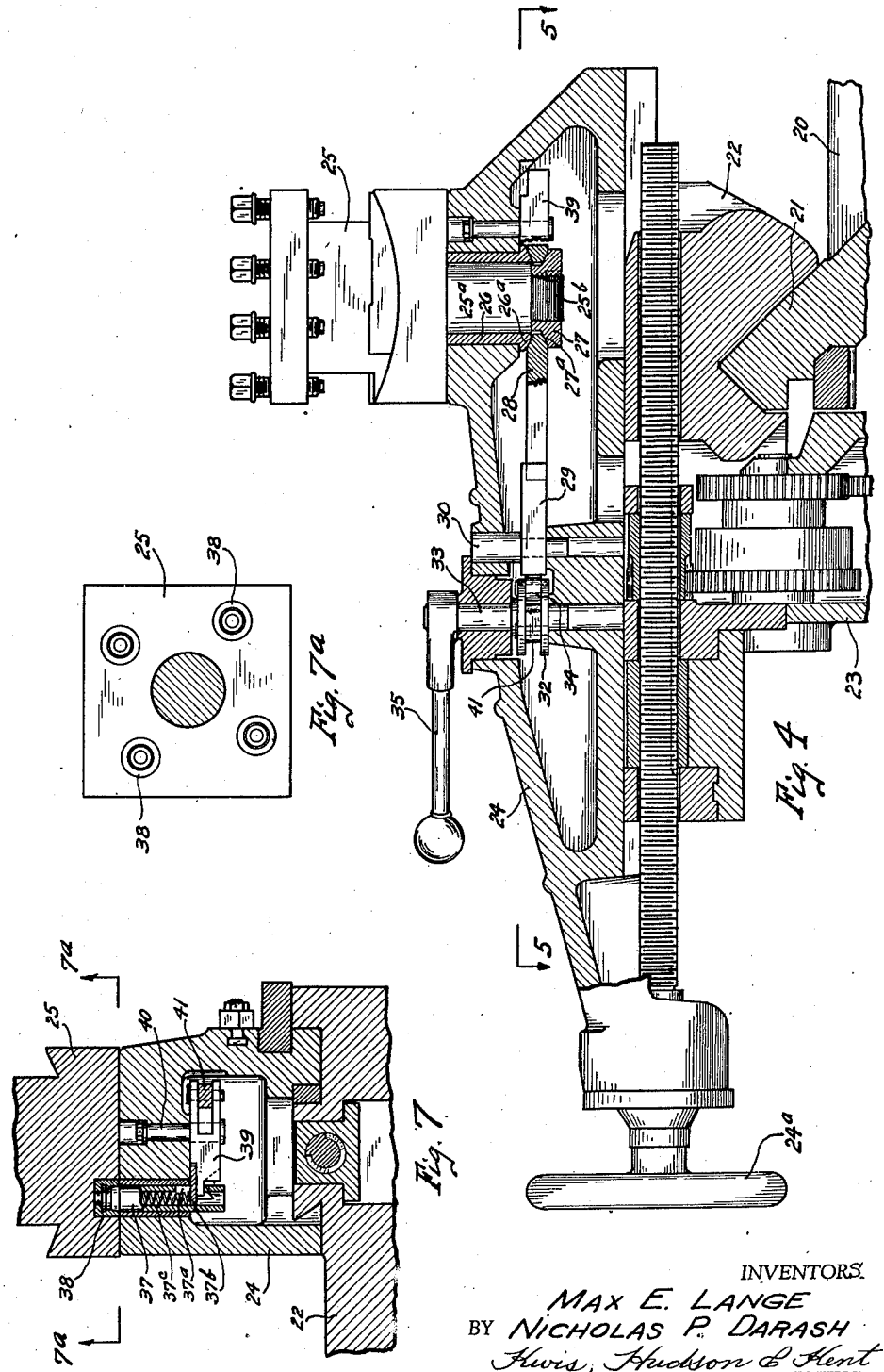

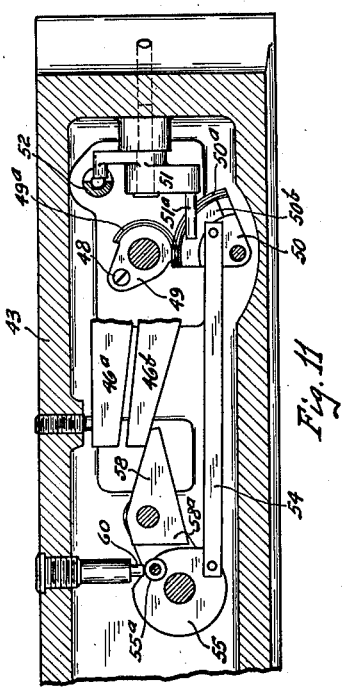
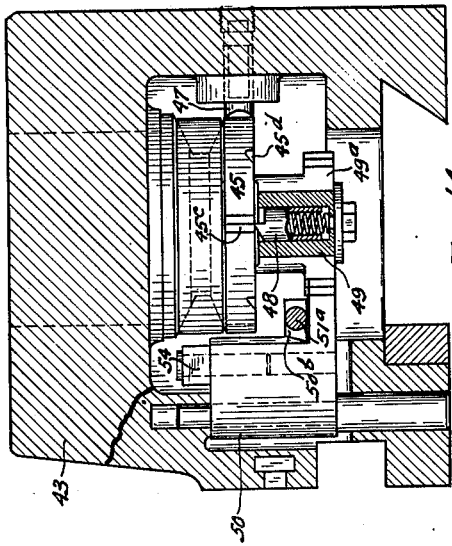
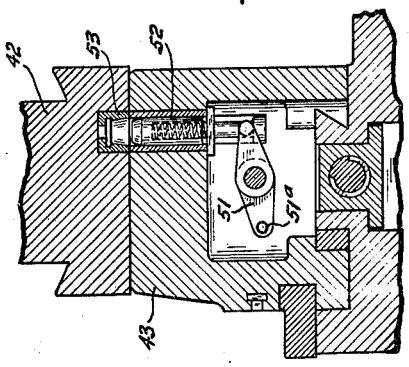
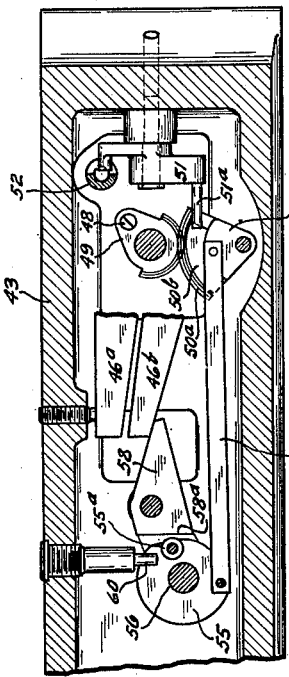
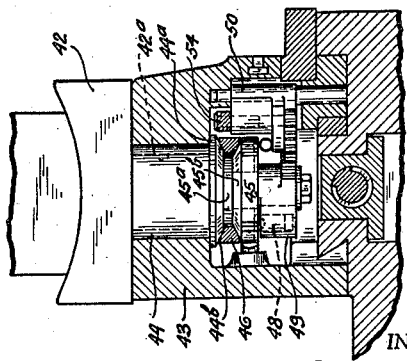

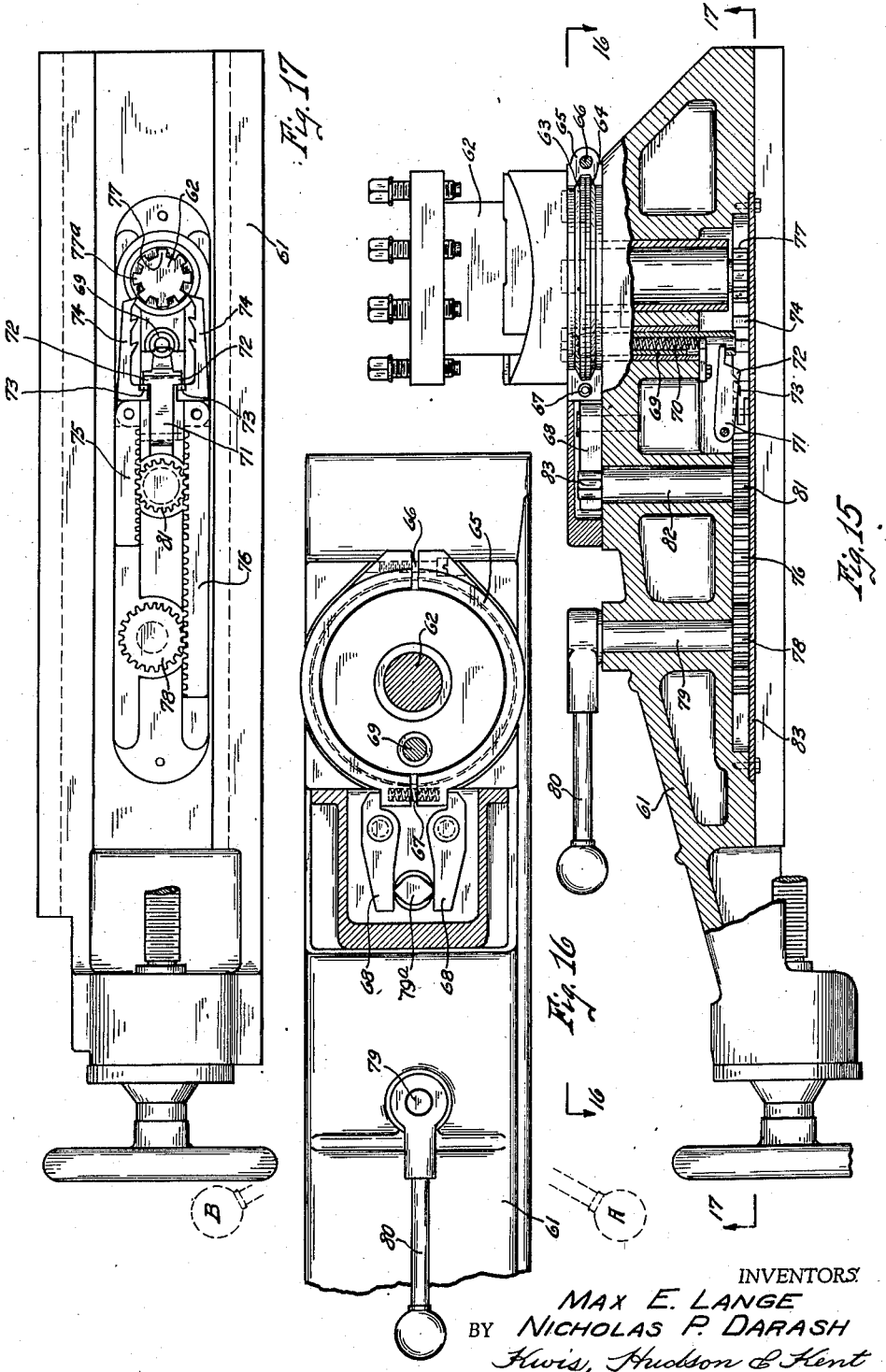

Patented Sept. 6, 1938

2,128,950

UNITED STATES PATENT OFFICE 2,128,950

MACHINE TOOL

Max E. Lange, Cleveland Heights, and Nicholas P. Darash, Cleveland, Ohio, assignors to The Warner & Swasey Company, Cleveland, Ohio, a corporation of Ohio Application March 21, 1936, Serial No. 70,058

17 Claims. (Cl. 29—49)

This invention relates to a machine tool of the type having a cross slide provided with an indexible turret.

An object of the invention is to provide means to facilitate the indexing of the turret of the cross slide and including mechanism for unclamping, unlocking, locking and clamping the turret and which is controlled from a point remote with respect to the turret and located conveniently to the position of the operator and within his easy reach to thus increase the efficiency of operation of the machine.

A further object is to provide in a machine tool of the type having a cross slide provided with a turret, means for facilitating the indexing of the turret and which can be controlled by the operator from a point conveniently located to his usual operating position and one wherein tools, pilot bars or other members will not interfere with the unclamping, unlocking, locking and clamping of the turret.

A further object of the invention is to provide in a machine tool having a cross slide provided with an indexible turret means for unclamping and unlocking, and locking and clamping said turret and controlled by a lever located remotely with respect to the turret and positioned closely adjacent to the other control members for the cross slide and carriage, whereby the operator will not have to reach over the cross slide to control the turret.

Another object is to provide in a machine tool having a cross slide provided with an indexible turret, means which is controlled from a point remote with respect to the turret for unclamping, unlocking, indexing, locking and clamping the turret.

A further object is to provide in a machine tool having a cross slide provided with an indexible turret, means for unclamping, unlocking, indexing, locking and clamping the turret and including a control member located remotely with respect to the turret and closely adjacent to the other control members for the cross slide and carriage.

Further and additional objects and advantages not referred to above will appear hereinafter during the following detailed description of two embodiments of the invention which are illustrated in the accompanying drawings wherein, Fig. 1 is a side elevational view of the carriage of a machine tool with a cross slide mounted thereon, a portion of the bed and ways being shown in section, while a portion of the apron carried by the carriage is shown in elevation.

Fig. 2 is a fragmentary sectional view taken on the line 2—2 of Fig. 1 looking in the direction of the arrows and illustrating in front elevation a portion of Fig. 1.

Fig. 3 is a top plan view of the cross slide and turret, and of a portion of the carriage and bed shown in Fig. 1.

Fig. 4 is a sectional view taken substantially on line 4—4 of Fig. 3 looking in the direction of the arrows.

Fig. 5 is a horizontal sectional view taken substantially on line 5—5 of Fig. 4 looking in the direction of the arrows.

Fig. 6 is a fragmentary sectional view similar to Fig. 5 but showing the parts in a different position.

Fig. 7 is a sectional view taken substantially on line 7—7 of Fig. 5 looking in the direction of the arrows.

Fig. 7a is a detail sectional view taken substantially on line 7a—7a of Fig. 7 looking in the direction of the arrows.

Fig. 8 is a view similar to Fig. 4 but showing only the cross slide and turret and illustrating a different embodiment of the invention from that shown in Figs. 1 to 7 inclusive, and is taken substantially on the irregular line 8—8 of Fig. 9 looking in the direction of the arrows.

Fig. 9 is a horizontal sectional view taken substantially on line 9—9 of Fig. 8 looking in the direction of the arrows.

Fig. 10 is a fragmentary view similar to Fig. 9 but showing the parts in a different position.

Fig. 11 is a fragmentary view similar to Figs. 9 and 10 but illustrating the parts in a still different position.

Fig. 12 is a sectional view taken substantially on line 12—12 of Fig. 9 looking in the direction of the arrows.

Fig. 13 is a sectional view taken substantially on line 13—13 of Fig. 9 looking in the direction of the arrows and showing the lock bolt withdrawn to allow indexing of the turret.

Fig. 14 is a sectional view through the cross slide on an enlarged scale and is taken substantially on line 14—14 of Fig. 9 looking in the direction of the arrows.

Fig. 15 is a longitudinal vertical sectional view through a cross slide and illustrating a still different form of the invention from those previously illustrated, and wherein the remote control member indexes the turret in both directions, as well as withdrawing the lock bolt and actuating the clamping means.

Fig. 16 is a sectional view taken substantially on line 16—16 of Fig. 15 looking in the direction of the arrows, and Fig. 17 is a bottom plan view of the cross slide shown in Fig. 15 and is taken substantially on line 17—17 of Fig. 15 looking in the direction of the arrows.

Referring to Fig. 1 there is shown a portion of the bed 20 of a machine tool which is provided with the usual ways 21 (one only of which is shown). A carriage 22 is slidably mounted on the front way 21 of the bed and carries an apron 23 which at its lower end is supported upon a way (not shown) located on the front of the bed as will be well understood. The carriage is moved along the way by means of a pinion 23a carried by the apron and meshing with a rack 21a fastened to the bed beneath the way, as is well known in the art. The carriage 22 supports in the conventional manner a cross slide 24 which is moved inwardly and outwardly on the carriage by means of the usual screw manually operated by the hand wheel 24a at the front end of the cross slide or operated by a power drive through the usual gearing connecting the screw with the feed shaft, which, in turn, is driven by the work spindle, a portion of the gearing in the apron being shown in Fig. 4.

The cross slide 24 is provided with an indexible turret 25, in this instance a square tool holding turret, and which is provided on its under side with a cylindrical reduced extension 25a passing through a bushing 26 fixed in an opening in the cross slide, the lower end of the extension 25a having a reduced threaded portion 25b. The bushing 26 at its lower end is provided with an out-turned shoulder engaging the cross slide adjacent the opening, while the end of the bushing and shoulder is of conical tapered formation, as indicated at 26a, for a purpose to be later explained. A shoulder ring 27 is threaded on the reduced threaded portion 25b and is provided with a tapered conical surface 27a. The tapered conical surfaces 26a and 27a cooperate to form a tapered groove in which functions the clamp for the turret, it being understood that the shoulder ring 27 can be adjusted upon the threaded portion 25b until the groove is of the desired size in relation to the clamping ring and then locked in position by means of a lock screw. The clamp for the turret is indicated at 28 and comprises an integral substantially cylindrical split double conical ring engaging in the groove formed by the surfaces 26a and 27a, while from said conical ring extend two arms 28a and 28b which, due to the inherent spring in the ring, have a tendency to spread apart. It will be seen when the arms 28a and 28b are moved toward each other that the ring of the clamping member will be contracted in the groove formed by the surfaces 26a and 27a, and since the surface 26a is fixed such contraction of the ring will act on the surface 27a to move the shoulder ring 27 and extension 25a of the turret downwardly and produce the clamping friction between the contacting horizontal surfaces of the cross slide and the turret.

It will be understood that when the arms 28a and 28b of the clamping member are spread apart and in their normal inactive position, the turret is free for rotative indexing movement to operatively position the various tools carried thereby. In order to move the arms 28a and 28b of the clamping member relatively toward each other a lever 29 is fulcrumed on a bearing pin 30 mounted in the cross slide, and said lever 29 is provided adjacent one end with an inclined surface engaging the arm 28b and at its opposite end with a heel portion 29a. It will be seen when the lever 29 is moved in an anticlockwise direction, as viewed in Fig. 5, that the arm 28b will be moved toward the arm 28a which latter arm is in engagement with an adjustable stop 31, it being understood that said stop 31 can be adjusted to vary the relation between the arms to thus vary the clamping action of the clamping member. It will be noted that the split cylindrical clamping ring 28 can be positioned against the tapered outturned shoulder 26a of the bushing 26 and then the shouldered ring 27 can be screwed upon the reduced threaded portion 25b of the extension 25a of the turret to hold the clamping ring in position and in the groove formed by the tapered surfaces 26a and 27a. This arrangement permits an adjustment of the lower seat for the ring to vary the clamping action and also permits the use of an integral clamping ring.

In order to move the lever 29 a grooved spool 32 is fixed to or formed integral with a shaft 33 rockably carried by the cross slide and extending beyond the upper side thereof. The spool 32 is provided between the flanges thereof and in the groove of the spool with a roller 34 mounted on a pin carried by the flanges, and said roller contacts with heel portion 29a of the lever 29 when the latter has moved the arms of the clamping member to a position to effect a clamping of the turret, it being noted that the point of contact of the roller 34 with the heel portion 29a lies slightly below the line joining the point of contact of the lever 29 with the arm 28b and the center of the shaft 33, wherefore a locking action is obtained to maintain the clamping member in clamping position. A control lever 35 is fixed to the upwardly extending end of the shaft 33 and when said lever 35 is moved from the full line position shown in Fig. 3 to the dotted line position, the roller 34 moves out of engagement with the heel portion 29a of the lever 29 (as shown in Fig. 5) and into the position shown in Fig. 6, wherefore the pressure of the lever 29 upon the arm 28b is relieved and the turret is unclamped. When the roller 34 is in the position shown in Fig. 6 it contacts with the lower end of a spring plunger 36 slidably mounted in a suitable supporting bushing carried by the cross slide and forces said spring plunger inwardly of the bushing against the tension of the spring for a purpose later to be explained.

In order to positively lock the turret against rotation from the positions to which it has been indexed a spring pressed lock bolt 37 is slidably carried in the cross slide beneath one corner of the turret and is adapted to have its upper tapered end projected into one of a series of bushings 38 provided with tapered recesses and located substantially in the four opposite corners of the underside of the turret. It will be understood that when the turret is to be indexed to four positions four of the bushings 38 will be provided in the underside of the turret, see Fig. 7a, but when the turret is to be indexed to a different number of positions the number of the bushings 38 will vary to correspond with the number of the indexing positions.

The lower end of the lock bolt 37 is provided with an elongated cutaway portion 37a into which projects a plate 37b fixed to the cross slide and acting as an abutment for the lower end of the lock bolt spring 37c (see Figs. 5, 6 and 7).

A lever 39 is fulcrumed on a bearing pin 40 carried by the cross slide and is provided at one of its ends with a camming portion adapted to extend into and contact with the cutaway portion of the bolt to retract the latter to unlock the turret for rotation, the opposite end of the lever 39 being provided with a slot in which extends a link 41 that is pivotally connected with the lever by means of a pin extending through the latter and through said link, as clearly shown in Figs. 5 and 7. The opposite end of the link 41 is pivotally connected to the spool 32 by means of a pin carried by the flanges of the spool. When the parts heretofore described are in the position shown in Fig. 5 the control lever 35 will be in the full line position of Fig. 3 and the turret will be locked and clamped. When the lever 35 is moved substantially half way from the full line position to the dotted line position of Fig. 3 the roller 34 on the spool 32 will have moved out of contact with the heel 29a of the lever 29 and the turret will be unclamped. The continuation of the movement of the control lever 35 to the dotted line position of Fig. 3 and the continuation of the movement of the link 35 toward the right, as viewed in Fig. 5, then acts to move the camming portion of the lever 39 into the elongated cutaway portion of the lock bolt and to withdraw said lock bolt out of the bushing 38 to unlock the turret, it being remembered that such movement of the control lever 35 has brought the roller 34 into contact with the spring pressed plunger 36 to compress the spring thereof. This compression of the spring of the plunger 36 necessitates the operator retaining his hand upon the control lever 35 when it is in the dotted line position of Fig. 3, and while he thus holds the lever 35 he may index the turret with his other hand to the desired position. As the turret approaches the desired position the operator may then release his hold on the lever 35, whereupon the spring behind the plunger 36 acts to move the spool 32 in the opposite direction, that is, in a clockwise direction, thus causing the link 41 to withdraw the camming portion of the lever 39 from the cutaway portion of the lock bolt, whereupon when one of the proper bushings 38 in the turret is in alignment with the lock bolt the latter will automatically project into locking position to lock the turret. The operator now forces the lever 35 over to the full line position of Fig. 3 to again bring the roller 34 into engagement with the heel 29a of the lever 29 to produce a relative movement of the arms 28a and 28b to clamp the turret. The spring plunger 36 has the further function that when the lever 35 is moved to the dotted line position to unclamp and unlock the turret the end of such movement is cushioned by the engagement of the roller 34 with the lower end of the plunger.

In Figs. 8 to 14 inclusive there is illustrated an embodiment of the invention which differs from the embodiment shown in Figs. 1 to 7a inclusive, in that the indexing of the turret, in addition to the unclamping and unlocking thereof, is controlled by the same lever from a point remote with respect to the turret and located near the front end of the cross slide and adjacent the other control members for the cross slide and apron.

It will be understood that although only the cross slide and the turret carried thereby are shown in the figures illustrating the second embodiment of the invention said cross slide is mounted on a carriage provided with an apron and slidably supported upon the ways of the bed in the same manner as was the cross slide in the first described embodiment, since the differences in the two embodiments of the invention reside in the mechanism carried by the cross slide.

The turret 42 is mounted upon the upper side of the cross slide 43 and is provided on its underside with a reduced extension 42a passing through a bushing 44 fixed in an opening in the cross slide and provided at its lower end with a shoulder 44a contacting the under face of the cross slide and provided with a conical surface 44b (see Fig. 12). The reduced extension 42a is provided below the shoulder 44a with a further reduced portion upon which is mounted a shoulder ring 45 having a cylindrical portion 45a contacting with the shoulder 44a and also having a conical surface 45b cooperating with the conical surface 44b to provide a double conical groove in which is arranged the clamping ring 46 of the clamping member, which ring, as in the previously described form, is provided with arms 46a and 46b. The shoulder ring 45 is fastened to the reduced extension of the turret in any suitable manner to rotate therewith and is provided on the lower side of its periphery with a plurality of spaced notches 45c, there being four of said notches illustrated to correspond to the four indexing positions of the turret, it being understood that the number of notches might vary in accordance with the variations in the number of indexing positions of the turret, (see Figs. 9 and 14).

The underside of the shoulder ring 45 is provided with a plurality of radially extending notches 45d, the notches 45d being spaced 90° apart and located intermediate and corresponding in number to the notches 45c, it being understood that the number of the notches 45d will correspond to the number of the indexing positions of the turret. The notches 45c are adapted to cooperate with a spring point 47, while the notches 45d are adapted to cooperate with a spring-pressed catch 48, the purpose of the spring point 47 and catch 48 being explained hereinafter. An arm 49 is loosely mounted on the extension 42a of the turret 42 and has an arcuate portion at one of its ends in the form of a gear segment 49a. The opposite end of the arm 49 is provided with a bore in which is mounted the spring-pressed catch 48 previously referred to. The gear segment 49a of the arm meshes with a gear segment 50a formed on a pivoted arm or block 50, as clearly shown in Figs. 10 and 11. A cam surface 50b is formed on the upper side of the block 50 and said surface cooperates with a pin 51a carried by a rockable lever 51, the opposite end of said lever being operatively connected to the spring pressed lock bolt 52, as clearly shown in Figs. 10, 11 and 13. The lock bolt 52 is located beneath one corner of the turret and corresponds in construction and function to the lock bolt 37, preferably described in connection with the first embodiment, it being understood that the turret will have four bushings 53 into which the lock bolt projects and that the number of said bushings corresponds to the number of the indexing positions of the turret.

It will be seen when the block 50 is rocked from the position shown in Fig. 9 to the position shown in Fig. 10 the cam surface 50b of the block 50 has raised the pin 51a and rocked the lever 51 to withdraw the lock bolt 50 from the bushing 53, whereby the turret is free to index. The movement of the block 50 to the position shown in Fig. 10 from that shown in Fig. 9 similarly moves the arm 49, that is, the arm has rocked through an arc of 45° and the catch 48 will be engaged in one of the radial notches 45d. The movement of the block 50 from the position shown in Fig. 11 to the position shown in Fig. 10 rocks the arm 49 through an arc of 90° and due to the engagement of the catch 48 in the radial notch 45d the turret is indexed, the indexing movement of the turret causing the spring point 47 to be pressed out of the notch 45c and to bear on the periphery of the shoulder ring 45 until it aligns with the next notch 45c, whereupon it will snap into said notch and hold the turret against further movement until the lock bolt has been restored to locking position. When the block 50 is rocked from the position shown in Fig. 11 to the position shown in Fig. 10 the pin 51a rides on the cam surface 50b and the arm 49 is rocked in a clockwise direction, wherefore the catch 48 is disengaged from the notch 45d and rides along the under surface of the shoulder ring 45, the spring point 47 retaining the turret in its indexed position. The movement of the block 50 from the position shown in Fig. 10 to the position shown in Fig. 9 causes the pin 51a to leave the cam surface 50b, whereupon the lock bolt 52 is projected into the new bushing 53 in the under side of the turret, such further movement of the block 50, of course, causing a movement of the arm 49 with the catch 48 traveling along the under surface of the ring 45 a short distance beyond the next notch 45d, wherefore when the arm 49 is again moved in the opposite direction the catch 48 will readily engage in said notch 45d. The block 50 is pivotally connected to one end of a lever 54, the opposite end of said lever being pivotally connected to a spool 55 similar to the spool 32 previously described and mounted upon or integral with a vertically extending rockable shaft 56, the upper end of which shaft has secured thereto a control lever 57. The spool 55, as in the first described embodiment, is provided with a roller 55a which is adapted to engage with the heel 58a of a lever 58, as shown in Fig. 9. This lever 58 is rockable on a bearing pin and has its end opposite to the heel 58a engaging with the arm 46b of the clamping member, while the other arm 46a of said member abuts with an adjustable screw 59, as in the previously described embodiment, it being understood that when the lever 58 is rocked in a counter-clockwise direction the arms 46a and 46b are relatively moved together to cause the ring of the clamping member to tightly engage in the double conical groove formed by the surfaces 44b and 45b to pull the turret downwardly and thus effect a clamping of the same. The roller 55a is also adapted to engage a spring-pressed plunger 60, as shown in Fig. 11, for the purpose of cushioning the movement of the lever.

When the lever 57 is in the full line position as shown in Fig. 9, the roller 55a is in contact with the heel of the lever 58 and the turret is clamped by the clamping member and the lock bolt 52 is in locking engagement with one of the bushings 53. At this time the catch 48 is located substantially midway between adjacent notches 45d, as shown in Fig. 9, and the pin 51a of the lever 51 is free from the cam surface 50b of the block 50. When the control lever 57 is moved from the full line position of Fig. 9 toward the dotted line position thereof, the roller 55a first moves out of engagement with the heel 58a of the lever 58, whereby the turret is unclamped, while the block 50 is rocked to bring the pin 51a into engagement with the cam surface to withdraw the lock bolt and unlock the turret and to rock the arm 49 through a sufficient arc to bring the catch 48 into engagement with the next notch 45d. When this has occurred the parts are in the position shown in Fig. 10. The operator continuing the movement of the control lever 57 to the dotted line position shown in Fig. 9, the roller 55a engages the spring plunger 60 and compresses the same, thus cushioning the movement, while the rocking movement of the block 50 rocks the arm 49 and since the catch 48 is in engagement with a notch 45d the turret is indexed, it being recalled that the spring point 47 rides out of the notch 45c and along the periphery of the ring 45 until it snaps into the following notch 45c when the turret has been indexed. When the turret is being thus indexed the pin 51a rides on the top of the cam surface 50b and the lock bolt is held in its withdrawn position.

The operator can now move the lever 57 from the dotted line position of Fig. 9 toward the full line position thereof, such movement first acting to cause the catch 48 to move out of the notch 45d and to travel along the underside of the ring 45. The further movement of the control lever toward the full line position rocks the block 50 until the cam surface 50b has moved out of engagement with the pin 51a, whereupon the lock bolt is projected and the turret is locked and at the same time the catch 48 moves farther along the underside of the ring 45 until it has passed the next notch 45d. This further movement of the control lever toward the full line position brings the roller 55a into engagement with the heel 58a of the lever 58 to move the arms 46a and 46b toward each other to again clamp the turret, it being understood that the degree of clamping action can be varied by adjusting the screw 59.

In the embodiment illustrated in Figs. 15 to 17 inclusive the single remotely located control member in addition to controlling the clamping means and the locking means for the turret also actuates the indexing mechanism to index the turret in opposite directions, as desired. In this third embodiment the cross slide 61 is similar in structure to the cross slides previously described, and carries an indexible turret 62 which is provided with a circular conical flange 63 that cooperates with a similar circular conical flange 64 forming part of the cross slide. The flanges 63 and 64 are clamped together by means of a binder or clamping ring 65 formed in two halves and provided interiorly with a double conical groove interfitting the conical flanges 63 and 64. The clamping ring 65 is provided with an adjusting screw 66, and at its opposite side with a spring 67 located in laterally projecting portions of the two halves of the ring and acting to normally separate said halves to unclamp the turret. Pivoted fingers 68 engage the laterally extending portions containing the spring 57 so that when said levers are rocked in unison in one direction they will act to move the two halves of the clamping ring against the action of the spring 67 to clamp the turret.

The underside of the turret 62 is provided with four bushings similar to the bushings 38 to receive the lock bolt 69 that is normally urged upwardly by the spring 70. The lower end of the lock bolt is provided with a cut-away portion into which extends the finger of a pivoted lever 71. This lever 71 is provided with outwardly projecting cam portions 72 located on opposite sides of the lever which cooperate with cam portions 73 formed on pivoted indexing fingers 74 carried by a short rack 75 and by a long rack 76. The indexing fingers 74 are provided with spaced hook portions which are adapted to engage with the spaces between teeth 77 formed in the lower end of the reduced post of the turret, as clearly shown in Figs. 15 and 17. The long rack 76 meshes with a gear 78 fixed to the lower end of a vertically extending rockable shaft 79 that has fixed to its upper end the control member 80. The rack members 76 and 75 both intermesh with a gear 81 fixed to the lower end of a rockable vertically extending shaft 82, the upper end of which carries a double faced cam 83 to spread the fingers 68 to actuate the clamping ring 65 to clamping position. The racks and their associated mechanism are slidably mounted in recesses formed in the underside of the cross slide, as shown in Fig. 17, and when said racks have been assembled a cover plate 83 is secured to the underside of the cross slide to hold the assembly in position.

When the control lever is in the full line position shown in Fig. 16 the lock bolt is engaged in one of the bushings to lock the turret and the fingers 68 are spread, so that the clamping ring 65 clamps the turret and the parts are in the position shown in Figs. 16 and 17.

In order to unclamp, unlock and index the turret the operator moves the control lever 80 from the full line position of Fig. 16 to either of its dotted line positions A and B, depending upon the direction in which the turret is to be indexed. Such movement of the lever will move the long rack 76 which intermeshes with the gear 78 in one direction or the other depending upon the direction of movement of the lever, and this movement of the rack 76 will act through the gear 81 to rock the cam 79a to allow the spring 67 to open the clamping ring to unclamp the turret and will also move the short rack 75 in the opposite direction to the movement of the long rack 76.

Assuming that the control lever 80 was moved to dotted line position A to move the long rack in a direction toward the operator then the short rack 75 moves toward the turret and the first part of said movement acts to unclamp the turret and to swing the finger 74 in a clockwise direction, due to the engagement of the cam portions previously referred to, wherefore the lever 71 is cammed downwardly to withdraw the lock bolt. The further movement of the rack 75 toward the turret brings one of the hooks carried by the finger 74 into space 77a between two adjacent teeth 77 carried by the post of the turret. The further movement of the rack 75 to the right, as viewed in Fig. 17, then acts to index the turret, it being understood that by the time the first hook of the finger 74 has moved the turret partly around the second hook carried by said finger will engage in the next space between the teeth 77, and finally the third hook carried by the finger engages the third space and acts to complete the indexing movement of the turret, which, in this instance, is one quarter of a revolution in an anti-clockwise direction as viewed in Fig. 15.

When it is desired to index the turret in the opposite or clockwise direction, then the control lever 80 is moved from the full line position to its other dotted line position B to cause the long rack 76 to move toward the turret and the short rack to move toward the position of the operator, it being understood that the finger 74 carried by the long rack will function similarly as did the finger 74 carried by the short rack and will act to first withdraw the lock bolt and then to have its hooks successively brought into spaces between the teeth 77 of the turret post to impart the indexing movement to the turret. It will also be understood that during the first part of the movement of the short rack 75 toward the left, as viewed in Fig. 17, the hooks on the finger 74 connected to said short rack will pass idly over the teeth 77.

It will be understood that although in all the embodiments a square turret has been illustrated and four indexing positions indicated therefor, the number of indexing positions which might be given to the turret can be varied to suit operating conditions and also the turret can be other than a square turret.

Although preferred embodiments of the invention have been illustrated and described herein, it will be understood that the invention is susceptible of various modifications and adaptations within the scope of the appended claims.

Having thus described our invention, we claim:

1. In a machine tool having a cross slide provided with an indexible member, means for clamping said member and including an integral split clamping ring provided with elongated arms extending substantially midway between the front and rear of the cross slide, and means located adjacent the front end of the cross slide and operatively associated with said elongated arms for moving said arms relatively toward and away from each other to clamp and unclamp the indexible member.

2. In a machine tool having a cross slide provided with an indexible member, mechanism for clamping said member and including an integral split clamping ring provided with elongated arms, means for moving said arms relatively toward and away from each other to clamp and unclamp the indexible member, and means for adjusting the relative position of said arms to vary the degree of clamping action of the clamping ring.

3. In a machine tool having a cross slide provided with an indexible member, mechanism for clamping said member and including an integral split clamping ring provided with relatively movable arms extending substantially halfway toward the front end of the cross slide, means for moving said arms relatively toward or away from each other to clamp and unclamp the indexible member, and means including a control member located adjacent the front end of the cross slide for actuating said last named means.

4. In a machine tool having a cross slide provided with an indexible member, locking means for said member including a control member located directly on and adjacent to the front end of the cross slide, cam means for actuating said locking means, and means extending rearwardly of the cross slide from said control member to said cam means and operatively interconnecting the same.

5. In a machine tool having a cross slide provided with an indexible member, means for indexing said member including a ring indexible with said member and having recesses in its lower face, rockable means provided with a vertically slidable catch pin cooperating with said recesses for indexing the ring and said member, control mechanism located in and adjacent to the front end of the cross slide, and means operatively interconnecting said control mechanism and said rockable member.

6. In a machine tool having a cross slide provided with an indexible member, means for clamping and unclamping, locking and unlocking and indexing said member and including control mechanism for said means located adjacent the front end of the cross slide and comprising a rockable spool having spaced flanges and a roller mounted between said flanges, said spool having an operative connection with the indexing means and the locking means and said roller having an operative connection with the clamping means.

7. In a machine tool having a cross slide provided with an indexible member, separate mechanisms for clamping and unclamping, locking and unlocking and for indexing said indexible member, and means for actuating said mechanisms in sequence and including a rockable spool located adjacent the front end of the cross slide, and means operatively associating said spool with said mechanisms.

8. In a machine tool having a cross slide provided with an indexible member, separate mechanisms for locking and unlocking, clamping and unclamping, and indexing said member, a single control member for said mechanisms carried directly on and located adjacent to the front end of the slide and exteriorly thereof, and means extending from adjacent the front of the cross slide toward the rear thereof and operatively associating said control member with said mechanisms whereby said control member can operate said mechanisms in sequence.

9. In a machine tool having an indexible member, means for selectively indexing said member in opposite directions and including a control and actuating member for said means remotely arranged with respect to said indexible member.

10. In a machine tool having a member to be indexed, locked and clamped, mechanism for selectively indexing said member in opposite directions and also for locking and clamping and unclamping and unlocking said member and including a single control means remotely located with respect to said indexible member.

11. In a machine tool having a member to be indexed and locked, mechanism for selectively indexing said member in opposite directions and also for locking and unlocking said member and including a single control means remotely located with respect to said indexible member.

12. In a machine tool having a cross slide provided with an indexible member, means for selectively indexing said member in opposite directions and including a control and actuating member for said means positioned adjacent the front end of the cross slide and remote with respect to the indexible member.

13. In a machine tool having an indexible member, means for selectively indexing said member in opposite directions and including a control member remotely arranged with respect to the indexible member, and a pair of devices operatively associated with said indexing means and said control member for actuating the indexible member and movable in opposite directions upon movement of said control member.

14. In a machine tool having a member to be indexed, locked and clamped, mechanism for selectively indexing said member in opposite directions and for locking and clamping and unlocking and unclamping the same and including a control member remotely located with respect to said indexible member, and a pair of devices operatively associated with said mechanism and said control member and movable in opposite directions upon movement of said control member for actuating said indexible member and for locking and clamping and unclamping and unlocking the same.

15. In a machine tool having a cross slide provided with an indexible member, means for clamping and unclamping, locking and unlocking said member and including control mechanism for said means located adjacent the front end of the cross slide and comprising a rockable spool having spaced flanges and a roller mounted between said flanges, said spool having an operative connection with the locking means and said roller having an operative connection with said clamping means.

16. In a machine tool, a cross slide provided with a bearing opening having at its lower end a tapered shoulder, an indexible member provided with a bearing portion mounted in said bearing opening and having on its lower end an extension, an integral double conical clamping ring surrounding said extension and engaging the tapered shoulder of said bearing opening, and a shouldered ring adjustably secured upon said extension and having a tapered shoulder engaging said clamping ring.

17. In a machine tool having a cross slide provided with a member to be indexed locked and clamped, mechanism mounted directly in said cross slide for selectively indexing said member in opposite directions and also for locking and clamping and unclamping and unlocking said member and including a single control means remotely located with respect to said member.

MAX E. LANGE.
NICHOLAS P. DARASH.